United States Patent [19]

Rhodes et al.

[11] Patent Number: 5,214,581
[45] Date of Patent: May 25, 1993

[54] METHOD FOR OBJECT RECONSTRUCTION FROM X-RAY HOLOGRAMS

[76] Inventors: Charles K. Rhodes, 237 Delaware Pl., Apt. 10A, Chicago, Ill. 60611; Keith Boyer, 2511 35th St.; Johndale C. Solem, 220 Andanada, both of Los Alamos, N. Mex. 87544; Waleed S. Haddad, 1133 Drummond, #5A, Chicago, Ill. 60614

[21] Appl. No.: 466,042

[22] Filed: Jan. 17, 1990

[51] Int. Cl.$^5$ .............................................. G06F 15/00
[52] U.S. Cl. ........................... 364/413.19; 364/413.2; 364/413.21
[58] Field of Search ........... 364/413.19, 413.2, 413.21, 364/413.22; 382/6, 47

[56] References Cited

U.S. PATENT DOCUMENTS 4,412,289 10/1983 Yamaguchi et al. ............ 364/413.19
4,993,075 2/1991 Sekihara et al. .................... 382/6

OTHER PUBLICATIONS

Leszczyniski et al., Alternative Reconstruction Algorithm for NMR Imaging, Mar. 1988; pp. 186-191.

*Primary Examiner*—Roy N. Envall, Jr.
*Assistant Examiner*—Ari M. Bai
*Attorney, Agent, or Firm*—Samuel M. Freund

[57] ABSTRACT

Apparatus for x-ray microholography of living biological materials. A Fourier transform holographic configuration is described as being most suitable for the 3-dimensional recording of the physical characteristics of biological specimens. The use of a spherical scatterer as a reference and a charge-coupled device two-dimensional detector array placed in the forward direction relative to the incident x-radiation for viewing electromagnetic radiation simultaneously scattered from both the specimen and the reference scatterer permits the ready reconstruction of the details of the specimen from the fringe pattern detected by the charge-coupled device. Both laser and synchrotron radiation sources are feasible for generating microholographs. Operation in the water window (2.4 to 4.5 nm) should provide maximum contrast for features of the specimen and spatial resolution on the order of the wavelength of x-radiation should be possible in all three dimensions, which is sufficient for the visualization of many biological features. It is anticipated that the present apparatus will find utility in other areas as well where microscopic physical details of a specimen are important. A computational procedure which enables the holographic data collected by the detector to be used to correct for misalignments introduced by inexact knowledge of the relative positions of the spherical reference scatterer and the sample under investigation has been developed.

4 Claims, 7 Drawing Sheets

METHOD FOR OBJECT RECONSTRUCTION FROM X-RAY HOLOGRAMS

BACKGROUND OF THE INVENTION

The present invention relates generally to generation of holograms, and more particularly to the generation of x-ray holograms of biological specimens.

Recent advances in coherent x-ray source technology are making diffraction-limited holograms of microscopic structures, with corresponding high spatial resolution, a reality. A useful application of snapshot x-ray holography is the study of microscopic biological structures in the living state. X-rays offer high resolution and high contrast ratios for the important structures within living organisms, thereby rendering the staining of specimens, essential for optical and electron microscopy unnecessary if the wavelength is properly chosen. Picosecond time resolution, which would eliminate blurring due to thermal heating from deposition of incident energy and due to normal biological activity of the sample is also possible. Finally, with sufficiently high photon fluxes, such as those available from x-ray lasers, the x-ray snapshot can be accomplished with a single pulse yielding complete three-dimensional information of a sample having normal biological integrity at the moment of the snapshot.

A description of holographic techniques for imaging microscopic structures with a short-pulse, high intensity, high-quantum-energy laser is set forth in "Holography At X-Ray Wavelengths," by J. C. Solem, G. C. Baldwin, and G. F. Chapline, Proc. Int'l. Conf. on Lasers, pp. 293-305 (1981). Several important points therein will be summarized. First, Fresnel holography has the simplifying aspect of requiring but one laser beam. The subject specimen is placed in the laser beam itself, which beam also provides the reference. This technique, however, requires very high resolution recording media. That is, the minimum spacing which can be resolved is greater than twice the grain spacing of the medium. This result is independent of the wavelength of the incident radiation as long as the angles are small. At large diffraction angles and short wavelengths, the surface smoothness of the medium becomes important as well as its intrinsic graininess.

Fourier transform holography, by contrast, requires a reference source which emits spherical or convex curved waves, which interfere with the waves from the subject specimen at a recording surface. The specimen is illuminated by a plane wave source. The procedure is called Fourier transform holography because every distance from the reference source maps to unique spatial frequency at the recording surface. The maximum spatial frequency of the interference pattern can be adjusted arbitrarily by placing the object at various distances from the reference source. A shortcoming of the Fourier holography method described, supra, is that a spherical recording surface is required in order to obtain a complete cycle of intensity fringes for closely spaced features in the specimen. However, if the point spacing is less than the wavelength, a full cycle is never obtained. The physical spacing of the fringes can be made arbitrarily large by expanding the radius of the sphere. Therefore, ordinary film of arbitrarily large grain size could be employed as long as the trade-off between sensitivity and resolution was favorable.

In order to obtain the spherical reference wave for Fourier holography one must have a lens that focuses to a pinhole in the shadow plane. In the x-ray region of the electromagnetic spectrum a Fresnel zone plate is used to accomplish this. However, the hologram resolution is limited to finest spacing on such a plate, currently about 10 nm. An alternative would be to use a coherent scattering *backward* reflector to generate the spherical reference waves. In FIG. 6 of the Solem reference, supra, the authors show a parabolic reflector enclosed in a spherical shell recording surface. For best contrast ratio, the paraboloid would have to be approximately the same size as the object. The reference scatterer need not be a paraboloid. In principle, the hologram could be unfolded for any convex reference scatterer as long as the shape and dimensions thereof were known to within a fraction of a wavelength.

In "X-Ray Biomicroholography," by Johndale C. Solem and George F. Chapline, Opt. Eng. 23, 203 (1984), the authors state that most of the information about the fine details of the specimen appears at large scattering angles and can be degraded by recording surface roughness. The problem is mitigated by using a spherical recording surface. However, the reference scatterer will have a low scattering efficiency, as will the specimen, and the intensity of reference- and specimen-scattered waves will approximately match for highest contrast. The authors also discuss briefly the use of an x-ray photocathode and microchannel plates. However, the authors state that such devices saturate easily, have a small dynamic range, and are available only in fairly small sizes.

Accordingly, it is one object of the present invention to provide an apparatus for recording high resolution x-ray holograms.

Another object of our invention is to provide an apparatus for electrically recording high resolution x-ray holograms of biological samples using currently available electronics technology.

Yet another object of the present invention is to provide a method for obtaining a faithful reproduction of objects from detected holograms thereof.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention includes a spherical reference scatterer located in the vicinity of the sample under investigation, means for generating substantially monochromatic and substantially coherent x-radiation having sufficient size and intensity to simultaneously illuminate the sample and the spherical reference scatterer, means for detecting and recording spatial frequencies in the forward direction relative to the incident x-radiation resulting from the interference of x-radiation scattered by the sample and by the spherical reference scatterer, and means for reconstructing the image of the sample. Preferably, the spherical reference scatterer has approximately the same cross section to the incident x-radiation as the cross section of the sample. It is also preferred that the means for generating x-radiation includes a pulsed x-ray laser operating at a wavelength between 0.1 and 10 nm which includes the "water window", but also shorter wavelengths which correspond to the absorption edge of other biologically important elements such as phosphorus and calcium to name two. Preferably also the spherical reference scatterer is fabricated from nickel, rhenium, iridium, or osmium, or combinations thereof depending on the wavelength employed since the maximum angle of significant specular reflection is wavelength dependent.

The present invention may also include means for flowing the spherical reference scatterer and the sample through the x-radiation.

In a further aspect of the present invention, in accordance with its objects and purposes, the method of reconstructing an image from a detected hologram hereof includes calculating basis functions which are the set of all holograms of the individual points which comprise the object, and projecting the hologram function measured by the detector array onto the basis functions thereby yielding the amplitude, $|R_i|$, of the points in the reconstructed object.

Benefits and advantages of our invention includes the ability to perform 3-dimensional x-ray microholography of living hydrated biological materials using either synchrotron or laser sources, only one optical element, a low resolution, two dimensional detector, and analyzing the detector output by employing a suitable algorithm and computer hardware.

BRIEF DESCRIPTION OF THE DRAWINGS

The accompanying drawings, which are incorporated in and form a part of the specification, illustrate two embodiments of the present invention and, together with the description, serve to explain the principles of the invention. In the drawings.

DETAILED DESCRIPTION OF THE PREFERRED EMBODIMENTS OF THE INVENTION

Briefly, the present invention includes a Fourier-transform holographic microscope applicable for use with both x-ray lasers and synchrotron sources. The Fourier configuration is particularly suitable for high-brightness sources. Presently envisaged laboratory x-ray lasers will produce high intensity beams with narrow divergence. Self-channeling lasers may achieve diffraction limited divergence with high spatial and temporal coherence. The narrow divergence, as well as the necessity for high resolution recording media, makes Fourier-transform holography preferable to Fresnel transform holography for investigating the ultrastructure of biological and other specimens, such as semiconductor devices. To perform Fresnel transform holography a large area of the recording surface must be illuminated with a reference beam, a procedure which would require an impracticable distance between the laser and the recording surface. Moreover, a high-resolution recording medium such as a photoresist would be required, adding significant complexity and time to the process of data acquisition and interpretation. According to the teachings of the present invention, an x-ray beam simultaneously illuminates both a reference scatterer and the specimen under investigation. The resulting scattered electromagnetic radiation is detected in the forward direction relative to the incident x-radiation by a charge-coupled device, since high resolution in the interference pattern recording is not required. The output from such a detector array is digitized and linked directly to a computer for reconstruction of the physical details of the specimen using a suitable algorithm which will be described hereinbelow.

The essential distinguishing features of the present invention over that described in the two Solem et al. references, supra, is the use of a spherical *forward* scatterer, not a *backward* reflector, and the positioning of a substantially planar detector array in the forward scattering direction, as opposed to a spherical detection system which observes backward scattered electromagnetic radiation. In fact, there are no single materials which have significant scattering efficiency at large angles. In order to achieve large angle reflectivity, one must utilize multilayer materials which are useful only over a very narrow range of wavelengths. For such materials it is also difficult to precisely define the shape. This latter problem is a serious one since the generation of accurate physical characteristics of the specimen under investigation is dependent on the details of the shape of the reference scatterer.

Figure 1:
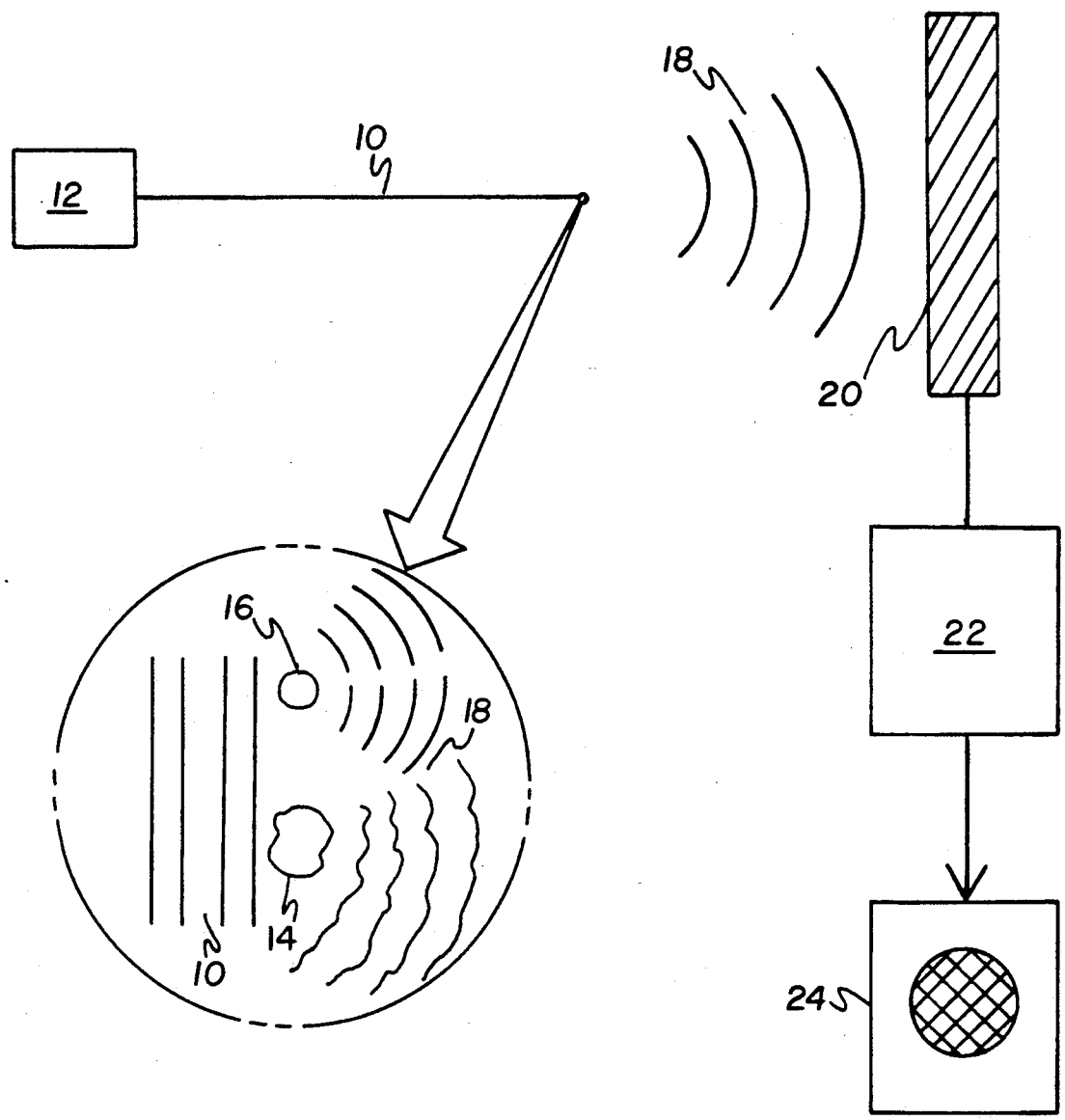
FIG. 1 is a schematic representation of one embodiment of the apparatus of the present invention showing the incident x-radiation from a source thereof, the specimen under investigation and the spherical scatterer (both fixed in position on a substrate), the x-ray charge-coupled device array for viewing the scattered electromagnetic radiation in the forward direction, and the computer system for data processing.

Reference will now be made in detail to the present preferred embodiments of the invention, examples of which are illustrated in the accompanying drawings. All similar or identical structure will be identified using the same callout numbers. Turning now to FIG. 1, there is schematically illustrated one embodiment of the apparatus of the present invention. Radiation 10 from x-ray source 12 is directed onto scatterers 14 and 16 which include a sample to be investigated 14 and a reference scatterer 16. Electromagnetic radiation 18 scattered in the forward direction from scatterers 14,16 is detected on planar charge-coupled device 20. The output from detector 20 is recorded by data processing system 22, and displayed by graphic display terminal 24. The apparatus of our invention is compatible with both x-ray laser sources and synchrotrons. A laser source is preferable, since, as a consequence of the substantially greater brightness, a sufficient exposure rate will be present to record the holographic data in a single pulse. This feature eliminates blurring due to incident energy being deposited in the specimen. The wavelength region of particular interest for hydrated biological samples is in the region of the water window (2.36–4.47 nm), since this range of wavelengths gives the greatest contrast for biological structures in the presence of water. However, in general, x-radiation in the region from 0.1–10 nm will be useful to contrast elements such as calcium, phosphorus, sulfur, sodium and potassium.

Spherical reference scatterer 16 is located in proximity to specimen 14 and furnishes the reference beam required for Fourier transform holography. If the scatterer were a perfect reflector, the reference illumination would be isotropic. However, since specular reflectivity is not strong in the soft x-ray region of the electromagnetic spectrum, and changes rapidly with grazing angle, forward scattering was observed in order to maximize the signal-to-noise ratio of the apparatus. A survey of the periodic table for elements having optimum specular reflectivity to serve as reference scatterers for Fourier transform holography in the spectral region of the water window has yielded that nickel is optimum at the water window threshold (4.47 nm) and osmium is optimum at the wavelength of maximum contrast (3.16 nm), nitrogen $K_\alpha$-edge. Both elements are sufficiently reflective at moderately large angles (20°–30°) to render the present apparatus useful for microholography. In order to use spheres of these elements as reference scatterers, it is necessary to fabricate such spheres in the appropriate sizes (approximately having the same cross section to the incident radiation as the specimen under investigation) and having sufficient sphericity and surface smoothness. Calculations suggest that nickel spheres in the 2–10 μm range can be fabricated in laser produced plasma sprays to a high degree of surface smoothness and roundness. Smoothness of the reference scatterer is important to avoid speckle as will be discussed further hereinbelow. Extant data on droplet formation in a plasma jet for nickel-base brazing alloy and copper support the conclusion that plasma sprays can generate appropriate reference spheres. See, e.g., "Fine Powders Produced by Plasma Processing," by W. A. Johnson, N. E. Kopatz, and E. B. Yoder, in *Progress in Powder Metallurgy*, Vol. 42 (Netal Powder Industries Federation, 1986) p. 775. Although investigation of the spheres generated from such sprays indicates evidence of imperfections arising from particle-particle collisions occurring in the spray, it is believed by the coinventors that a reduction of particle density can eliminate this effect. It should be mentioned that any shape scatterer would be appropriate for Fourier-transform microholography as long as the exact shape and orientation are known. Microspheres are therefore most appropriate for use since their orientation is irrelevant.

An evaluation of potential biological samples has been made and the apparatus of the present invention may be used to investigate numerous and varied specimens. Clearly, according to the teachings of our invention, samples other than biological specimens can be studied. For example, the physical characteristics of semiconductor chips might be evaluated. Given the opacity of water in the soft x-ray region, a useful and practical biological sample thickness would be approximately 1 μm. As a matter of practicability, it is desirable to have a statically mounted scattering system with both the reference scatterer and the sample placed on a thin foil. In such a configuration, it is necessary to choose a foil having low scattering power so that it negligibly influences the transmission of the soft x-rays. Moreover, it is important that the structure not degrade the spatial coherence of within a fraction of a wavelength over the useful portion of the beam. Therefore, the foil must have a substantially uniform thickness over the region exposed. Suitable materials for selection are thin sections of low-Z material such as beryllium and carbon. Commercially available support grids for films include structures made of beryllium, carbon composite, nylon mesh coated with carbon, copper, and gold. Such grids are available in a range of meshes, as well as honeycomb, with round and slit hole designs, and are routinely used for electron microscopy. The coinventors believe that carbon and beryllium films having a thickness between 100 and 200 Å can be used.

Figure 2:
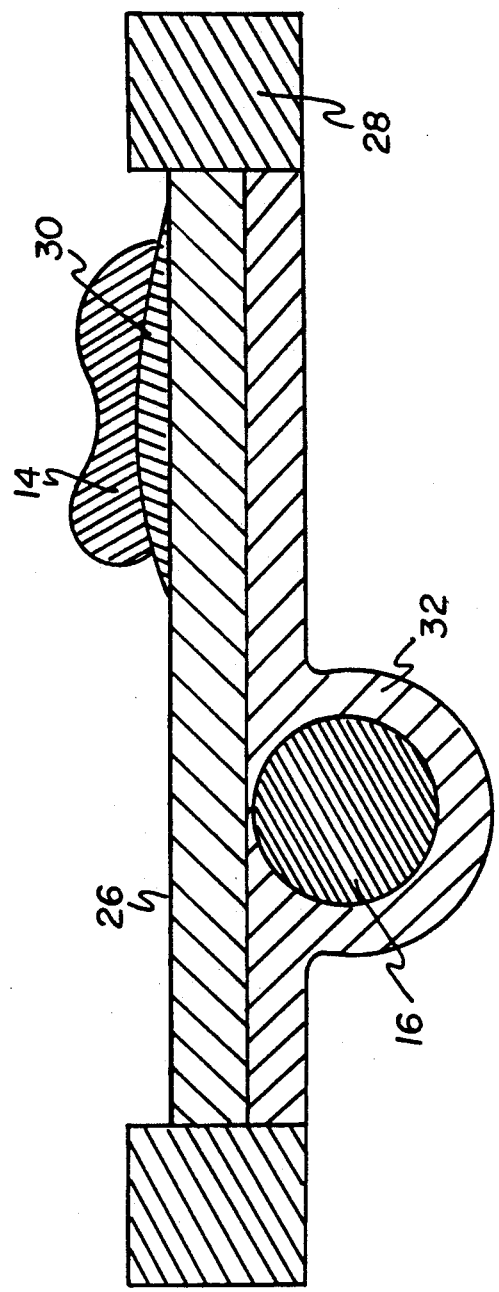
FIG. 2 is a schematic representation of a supporting foil and grid for fixing the spherical scatterer and the sample under investigation in the path of the x-radiation.

FIG. 2 shows a schematic representation of the spherical reference scatterer 16 and the biological specimen 14 under investigation mounted on a supporting foil 26 which is located on a supporting grid structure 28. Since carbon and beryllium films have a low affinity for biological materials, a thin layer of poly-L-lysine 30, which has a high charge affinity for many biological specimens, should adequately anchor the samples. The carbon foil 26 would first be suspended over the open regions of the grid. The Ni/Os reference sphere would then be placed on the foil and encapsulated by a thin evaporated carbon layer 32, thereby fixing its position. At this stage, the system is a blank on which a suitable biological specimen can be located. This last step in the preparation of the scattering system, the placement of the biological material, can be performed under circumstances suitable for the handling of a hydrated sample. Micromanipulation of the scattering system must be used to place the target properly in the path of the x-ray beam.

Figure 3:
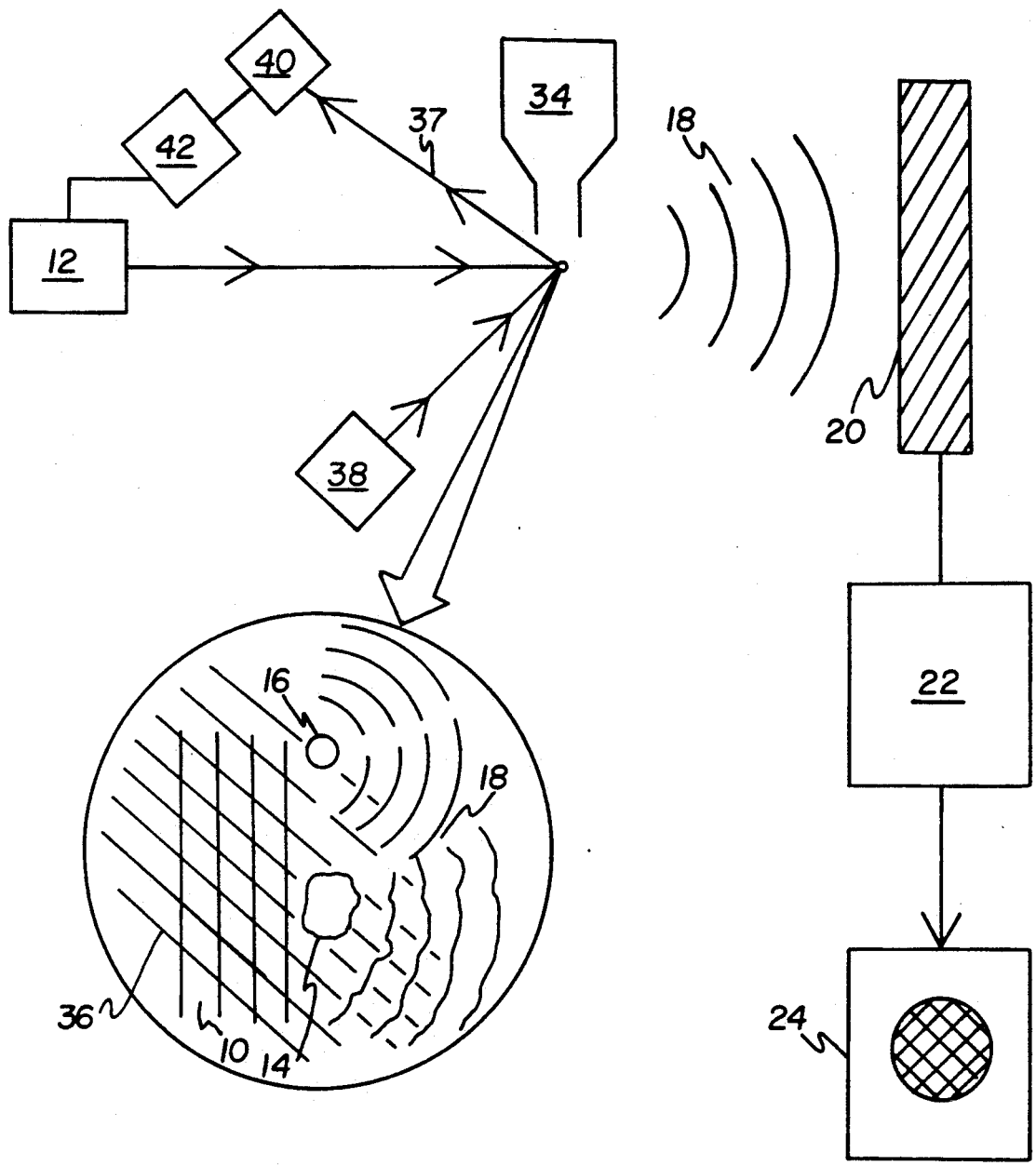
FIG. 3 is a schematic representation of a second embodiment of the apparatus of our invention showing the same elements shown in FIG. 1 hereof except that the spherical scatterer and the specimen are flowed through the region of x-radiation and are detected by a second laser device utilized for activating the x-ray source.

A second embodiment of the apparatus of the present invention is shown in FIG. 3. Scattering systems would be injected into the region of the x-ray beam using a microflow device 34, such as a flow cytometer. Radiation 36 from laser 38 is scattered into detector 40 by the spherical reference scatterer and the sample under investigation. The output from detector 40 is amplified by amplifier 42 which is directed to the source of x-radiation 12 for the purpose of triggering this source when the scatterers are in the appropriate position. This procedure eliminates any degradation of the scattering image through imperfections in the foil required in the static system shown in FIG. 2 hereof.

Figure 4:
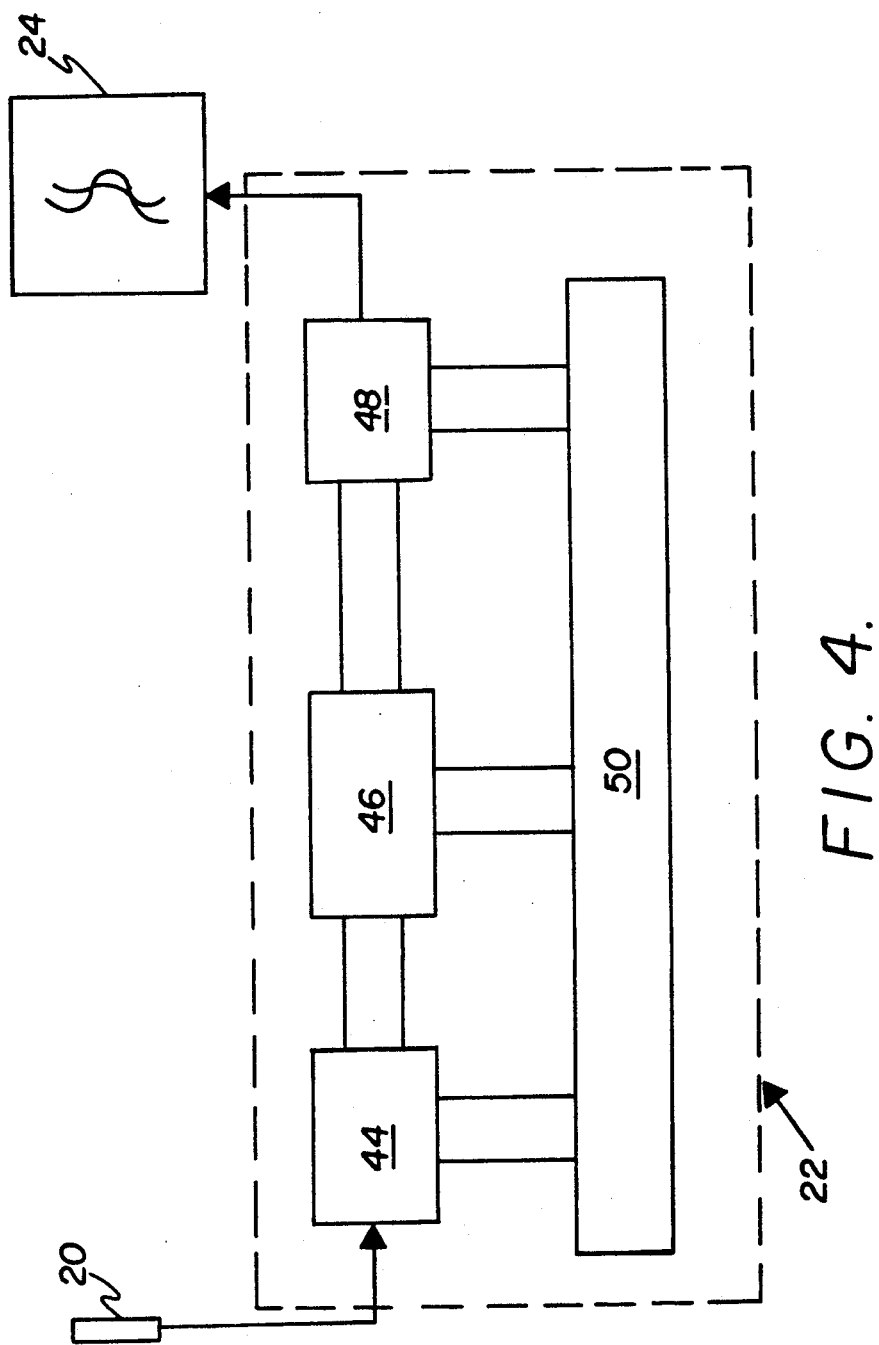
FIG. 4 is a schematic representation of the image reconstruction system showing the hologram detector, the video digitizer, the array processor the display controller, the host computer and the display.

FIG. 4 is a schematic representation of the interrelationship among the electronic components of the image reconstruction system of the present apparatus. Shown are hologram detector 20, video digitizer 44, which processes the output from detector 20, array processor 46, display controller 48, and graphics display 24 which receives the image reconstructed from the hologram detected on hologram detector 20. Video digitizer 44, array processor 46, and display controller 48 interact with computer 50 in the image reconstruction process.

Figure 5:
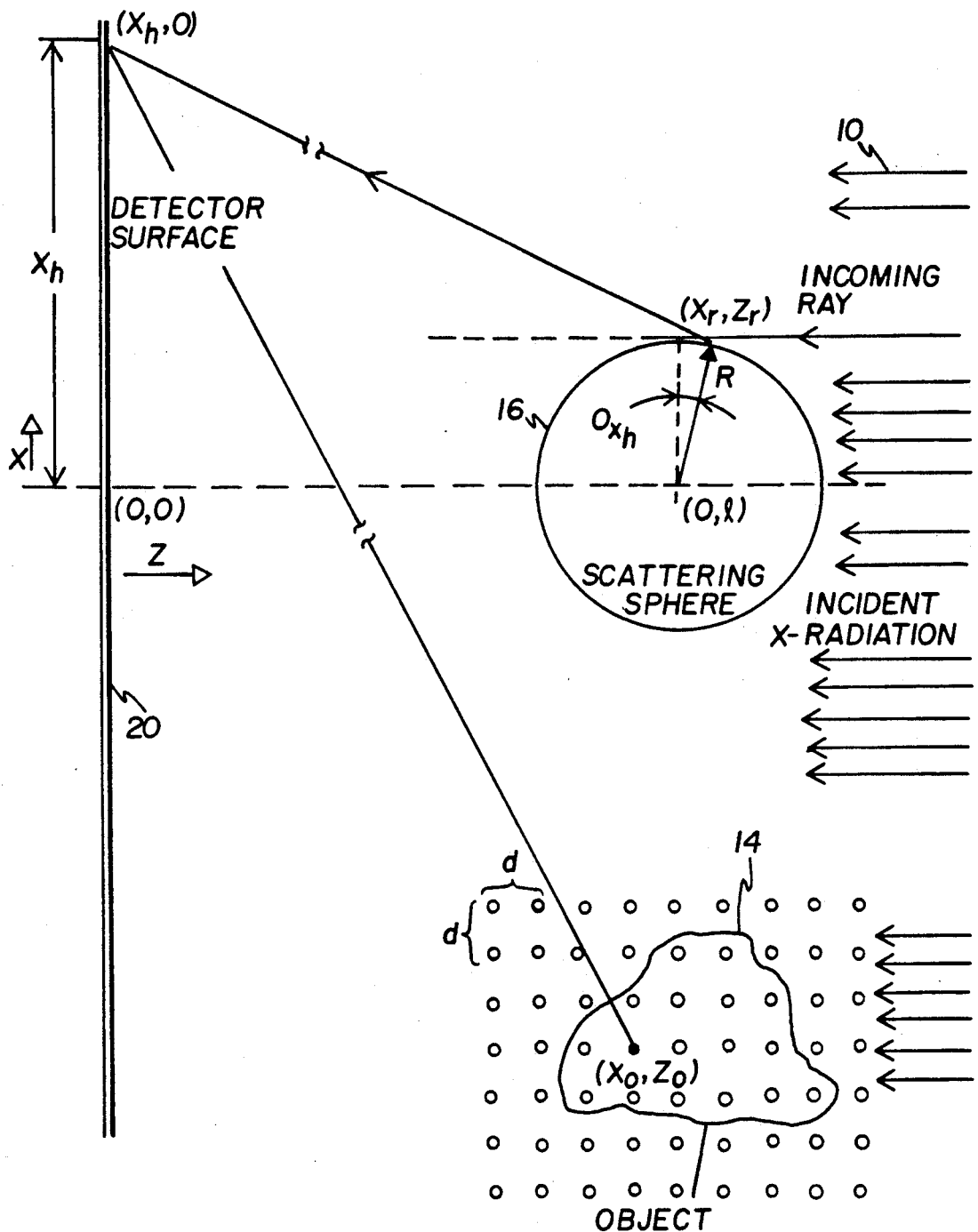
FIG. 5 is a schematic representation of the details of the geometric relationships among the scattering bodies and the charge-coupled device. In particular, the location on the charge-coupled device array of an incident x-ray reflected at an angle $\theta$ by the reference scatterer is shown, as are the pixel spacing d and the scattering system-charge-coupled device separation 1.

FIG. 5 shows the geometric relationship among the scatterers and the detection device in two-dimensions. In actuality, a three-dimensional image would be reconstructed from a two-dimensional hologram. Charge-coupled devices are currently being developed for x-ray astronomy. Such devices can be used for imaging over the range between 0.1 and 1000 nm with a greater than 80% efficiency in the soft x-ray region. Moreover, these direct electronic readout devices have a noise level of about 1 $e^-$/pixel/s and have a sufficiently high pixel density to provide spatial resolution adequate for Fourier transform holography at reasonable scatterer-detector distances.

It is desirable to avoid a large disparity between the reference-wave intensity and the specimen-scattered-wave intensity. The approximate mismatch which can be tolerated depends on the noise and dynamic range of the charge-coupled device. Since specular reflection is a rapidly decreasing function of scattering angle in the soft x-ray region of the electromagnetic spectrum, there is some angle $\theta$ beyond which the mismatch becomes too great and information cannot be extracted. Estimates derived from scattering data indicate that $\theta=30°$ for a nickel sphere at 4.47 nm and $\theta=22°$ for an osmium sphere at 3.16 nm. These estimated scattering angles are sufficiently large to give wavelength scale resolution in both the transverse and the longitudinal directions. Therefore, the acceptance angle imposed by the reference scatterer does not limit resolution of the subject apparatus.

Fourier transform holography basically maps distances in the specimen into spatial frequencies at the recording surface. The highest spatial frequency derives from the largest distance in the specimen. Therefore, the charge-coupled detector pixel size will then determine the greatest distance to be resolved which is the gross diameter of the specimen. A pixel spacing of about 15 $\mu$m is reasonable and with a mosaic of $3\times10^3\times3\times10^3$, which could be built with presently available technology, a scattering system would subtend an angle of 30° at a distance of about 7.4 cm from the charge-coupled device.

In the process of imaging a biological specimen in the x-ray region, there is little reflection or refraction in the specimen that can cause the random phase shifts which give rise to speckle. The optical element which may give rise to speckle is the spherical reference scatterer which creates the reference waves by specular reflection. Roughness on this surface can produce speckle and careful fabrication of the sphere is mandated, but is within currently available technology.

Finally, an estimate of the required x-ray pulse energy must be made. Simple calculation shows that this quantity is less than 10 $\mu$J, which can be achieved by currently available x-ray lasers (See, e.g., "Demonstration of Soft-X-Ray Amplification in Nickel-like Ions," by B. J. MacGowan, S. Naxon, P. L. Hagelstein, C. J. Keane, R. A. London, D. L. Matthews, M. D. Rosen, J. H. Scofield, and D. A. Whelan, Phys. Rev. Letters, 59, 2157 (1987).). It should be mentioned that cw x-ray sources may be employed if the sample is immobile. That is, for a biological sample, one might cool the sample to reduce motion in order for the sample to receive sufficient irradiation to provide reliable data.

The theoretical approach to the reconstruction process is based on projecting the magnitude of each of a set of basis functions which map to individual points in the reconstruction space. A more detailed description of the analytic process is described in "A Description Of The Theory And Apparatus For Digital Reconstruction Of Fourier Transform Holograms," by W. S. Haddad, J. C. Solem, D. Cullen, K. Boyer, and C. K. Rhodes, summary submitted on Sep. 12, 1987 for Electronics Imaging '87, held on Nov. 2-5, 1987 in Boston, Mass., the disclosure of which is hereby incorporated by reference herein. The object is described as a collection of point sources of scattered radiation. In the limit of large distances from the object and reference scatterers, the reconstruction reduces to a Fourier transform. However, this limits the analysis to a two-dimensional object, and a small aperture for the detector. In order to have good longitudinal and transverse resolution, a large detector aperture is necessary and the Fourier transform is no longer suitable as the reconstruction algorithm. A solution is found by approaching the problem as represented by the Fourier transform, but with the use of a different set of basis functions, not necessarily trigonometric. These functions can be thought of as the set of all holograms of the individual points which comprise the object. The projection or inner product of the hologram function measured by the detector array and the basis functions yields the amplitude, $|R_i|$, of the points in the reconstructed object ($|R_i|^2$=brightness). In principle, it is desirable that the $B_i$s be orthogonal. However, the lack of complete orthogonality due to the detector specifications and the system geometry and will always be present in any finite system, and is the principle source of distortion in the reconstruction process.

Since a hologram is intrinsically a phase-sensitive recording, it is expected that unwanted phase shifts will degrade the reconstructed image. This sensitivity is related to the fact that a phase error affects all of the information in the hologram. For example, when the basis set is calculated, the geometrical parameters of the holographic system must be entered as basic data. One such datum is the position of the reference scatterer which will always contain some uncertainty in its position relative to the detector. A computational procedure for enabling the measured holographic data to be used to correct the alignment of the basis set has been developed by the present inventors. If this correction is performed prior to the reconstruction of the image, full compensation can be achieved.

It is also possible to use digital processing to improve image quality and performance of the system. That is, the "confusing wave" effects can be removed by applying a high pass frequency filter to the hologram function before performing the reconstruction. The "confusing wave" arises from the interference among the various scattering bodies within the object under investigation. The hologram detected from this interference has low spatial frequencies since these bodies are close together. What is of interest, however, is the interference pattern of the scattering bodies within the object and the reference scatterer. If the reference scatterer is sufficiently far from the object, the important information can be observed at high spatial frequencies. Therefore, a high pass filter applied to the detected data will simplify the reconstruction process. Fast Fourier transforms can be used in a manner enabling efficient and rapid computation for this procedure. A Fourier-transform is obtained and the zero- and low-frequency terms made zero before the reverse-transform is calculated.

An algorithm has been developed and tested in two dimensions for reconstruction of the physical characteristics of samples from measured spatial frequencies. Geometrical optics and plane-wave irradiation were assumed. It was also assumed that the spherical reference scatterer is perfectly spherical. An expansion of the procedure to three-dimensions is now outlined. Referring now to FIG. 5 hereof, the two-dimensional description of the system to be analyzed, and generalizing to three-dimensions, if one defines $x_o$, $y_o$, and $z_o$ as the coordinates of pixels in the reconstruction volume, $x_r$, $y_r$, and $z_r$ as the coordinates of the center of the reference sphere, $x_h$ and $y_h$ as the coordinates of pixels on the surface of the hologram detector, N as the number of points in the reconstruction volume, $H(x_h,y_h)$ as the hologram function detected by the charge-coupled detector array, $B_i(x_h,y_h)$ as the basis functions used for the reconstruction, $R_i$ as the amplitude coefficients of pixels in the reconstruction volume, $\theta(x_h,y_h)$ as the grazing angle of reflection of the x-rays from the reference scattering sphere, $A(x_h,y_h)$ as the reflectivity function for waves scattered by the sphere, $s_x$ and $s_y$ as the error in the actual transverse position of the reference sphere, n as the "stretch" applied to the hologram to correct for error in the longitudinal position of the reference sphere, $C(s_x,s_y,n)$ as a sharply peaked function from which $s_{xp}$, $y_{xp}$ and $n_p$ may be determined, $s_{xp}$, $y_{xp}$, and $n_p$ being the coordinates where this function is maximized, and M is a constant background value to be subtracted from the detected hologram, the reconstruction process proceeds as follows.

Figure 6:
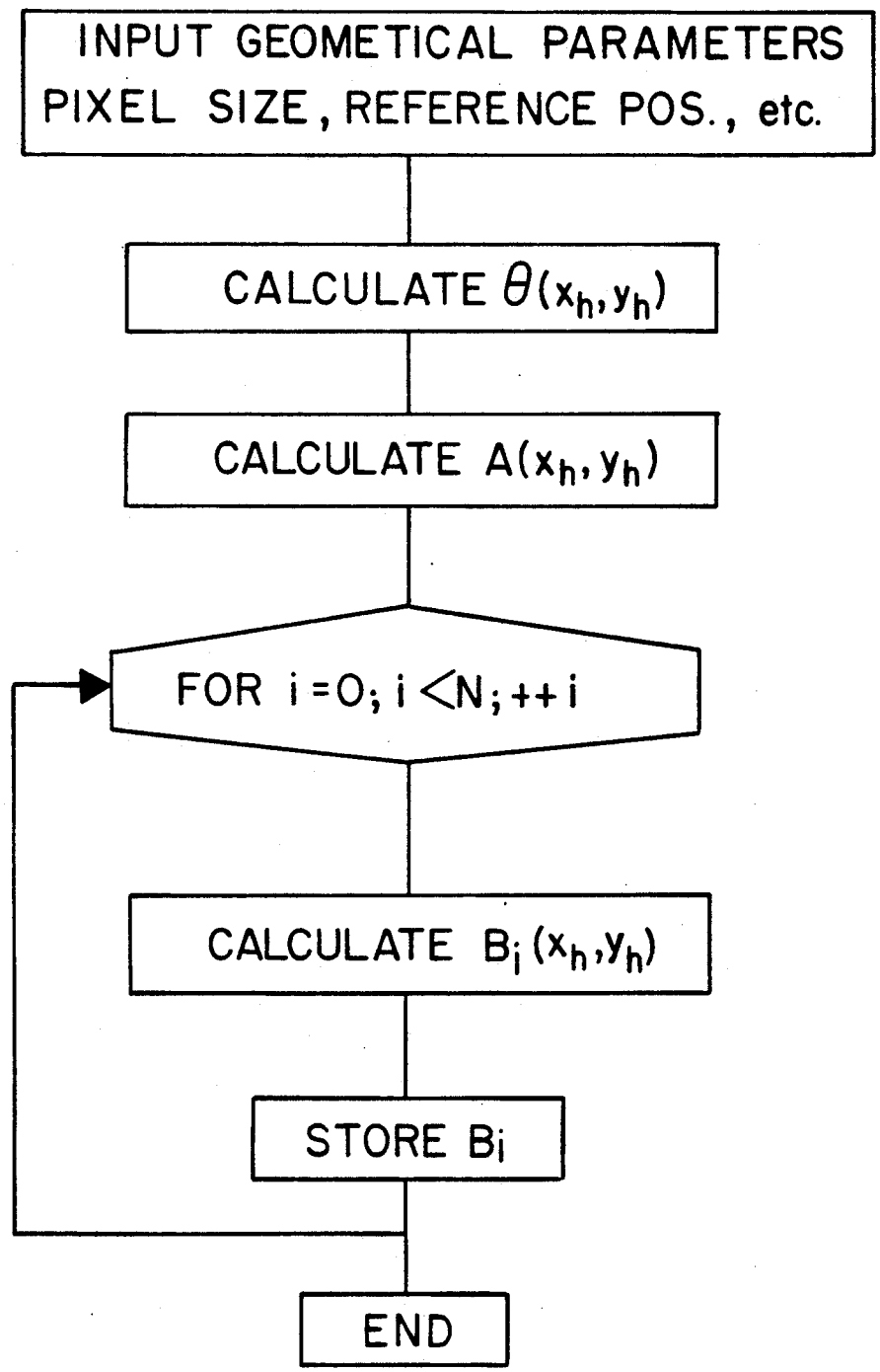
FIG. 6 is a flow diagram describing the process for generation of basis functions necessary for the reconstruction of the image from a detected hologram.
Figure 7:
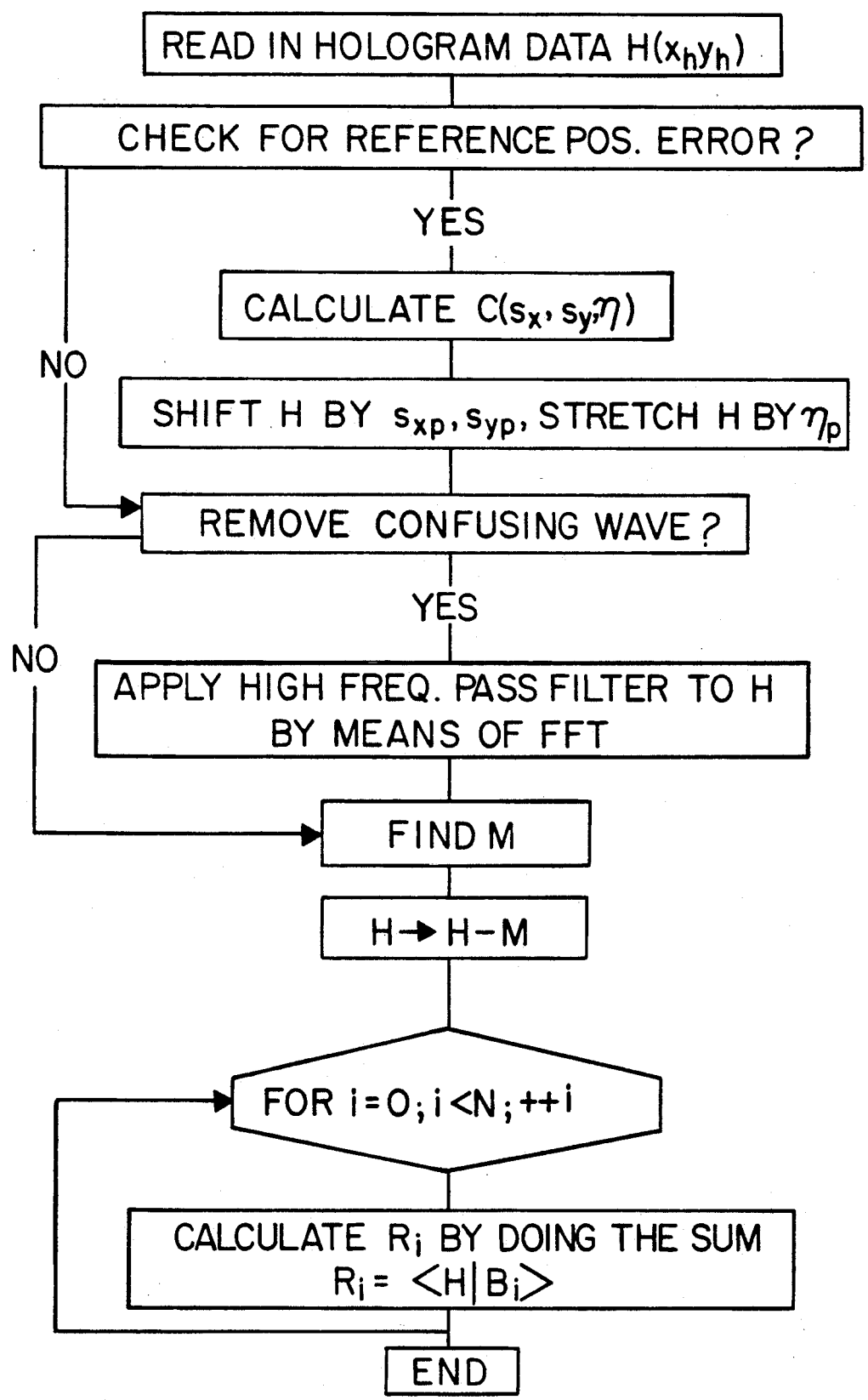
FIG. 7 is a flow diagram describing the process for reconstructing an image from the basis functions generated according to the flow diagram of FIG. 6 hereof and the intensities detected on a hologram recording device.

FIGS. 6 and 7 are flow charts for performing the reconstruction process. FIG. 6 describes the calculation of the basis functions, $B_i(x_h,y_h)$, necessary for reconstruction of the scattering specimen from the detected hologram. One begins by inputting the geometrical parameters, $x_o$, $y_o$, $z_o$, $x_r$, $y_r$, $z_r$, $x_h$, and $y_h$, the coordinates of the pixels, of the center of the reference sphere, and of the pixels on the hologram detector surface, respectively, as defined hereinabove and described in FIG. 5 hereof. Additionally, the sphere radius, r, and the table of reflectivities as a function of grazing angle are supplied. The phase correction introduced by $\theta(x_h,y_h)$, the grazing scattering angle for incident x-rays from the reference scattering sphere is then calculated. This is a purely geometrical calculation and is necessary since the incident radiation is scattered from the surface of the sphere having a radius, $r>0$ rather than from a point source. Since the incident radiation reflected by the reference sphere is planar, a particular point $(x_h,y_h)$ on the detector surface is reached by reflected light having a unique angle $\theta$. The basis vectors, $B_i$ represent interferences between a reference point $(x_r,y_r)$ and a point $(x_o,y_o)$ in the object. Therefore, phase corrections in the reference wave will generate corresponding corrections in these basis functions. $A(x_h,y_h)$, the reflectivity function for scattered radiation by the reference scattering sphere, which is a function of the material of the sphere and the wavelength of the incident radiation, is evaluated for each value of $\theta$ in order to determine the intensity of the scattered wave. Basically, the amplitude of the reflected wave diminishes for increasing angles of reflection. This causes the basis functions to decrease in amplitude at locations on the recording surface corresponding to large angle scattering, which will affect both the resolution and contrast of the reconstruction. Selective processing the holographic information prior to the reconstruction process to correct for the degradation of image has been found to improve the images obtained. One can then calculate and store the basis functions, $B_i(x_h,y_h)$. There is one B for each point in the reconstruction volume.

FIG. 7 schematically shows how one corrects the detected signal H for various physical factors, to be explained hereinbelow, and utilizes the values of the Bs just obtained to reconstruct the details of the specimen under investigation. Consider a misalignment in one of the transverse dimensions x or y. Such a misalignment translates directly into an error in the phase of the basis functions $B_i$. A misalignment in the longitudinal coordinate, z (i.e., the distance from the detector), corresponds to a compression or extension of the basis functions with respect to the hologram. As defined hereinabove, the compression/extension factor n, and the corresponding corrections to the position in the x and y coordinates, $s_x$, and $s_y$, respectively, are made the variables in a newly-defined correlation function $$C(s_x, s_y, n) = \int_{x_h} \int_{y_h} H(x_h, y_h) \cdot B_i[n \cdot (x_h - s_x), n \cdot (y_h - s_y)] dx_h dy_h.$$

Given the set of $C_i$ corresponding to the basis vectors $B_i$, a function, $D_i \equiv C_i(s_{xp},s_{yp},n_p)\delta(s_{xp},s_{yp},n_p)$ is constructed, in which $(s_{xp},s_{yp},n_p)$ are the coordinates for which $C_i$ is a maximum, and where $\delta(s_{xp},s_{yp},n_p)$ 1, $\delta$ being equal to zero for all other coordinates. One then defines a new function, $C(s_x, s_y, n) \equiv \Sigma D_i$ which has been found to exhibit a sharp peak at the point $(s_{xp},s_{yp},n_p)$ for any hologram. This function permits the quantities $s_{xp}$, $s_{yp}$, and $n_p$ to be determined for any holographic exposure, and the appropriate correction to the $B_{is}$ made. The measure of $s_{xp}$ will be in units of $x_h$, the $s_x$ and $s_y$ being integers because of the descrete pixel grid. Model calculations have confirmed the efficacy and practicality of this procedure. That is, phase errors are introduced into a hologram and reconstruction of the "damaged" hologram is performed. A phase correction of only 30 pixels will completely destroy the image of the object. If the correctional procedure outlined hereinabove is employed before reconstruction, the faithful reproduction is fully restored.

Uncontrolled variations in the amplitude of the hologram can degrade the quality of the image. Such variations can occur from either variations in the intensity of the reference wave, or from modulations in the sensitivity of the recording charged coupled device array. Fortunately, the sensitivity of the reconstructed image to variations in the amplitude of the hologram has been examined and found to be very low. High quality images can be reconstructed from holograms grossly altered by the loss of amplitude information over substantial regions of the exposure.

The "confusing wave" is now removed as described hereinabove. Finally, M, a constant background value is subtracted from the detected hologram in order to produce a purely oscillatory detected signal with no offset before the $|R_i|$ are calculated.

The foregoing description of two preferred embodiments of the invention has been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What we claim is:

1. A method for the point-by-point reconstruction of an image $|R_i|$ from a detected hologram $H(x_h,y_h)$ derived from the interference pattern of an object under investigation and spherical reference scatterer which comprises the steps of:

a. generating substantially monochromatic and substantially coherent incident x-radiation having sufficient size and intensity to simultaneously illuminate the sample and the spherical reference scatterer;

b. detecting and recording spatial frequencies in the forward direction relative to the incident x-radiation;

c. inputting the geometrical parameters, $x_o$, $y_o$, $z_o$, $x_r$, $y_r$, $z_r$, $x_h$, and $y_h$, the coordinates of the pixels, of the center of the spherical reference scatterer, and of the pixels on the hologram detector surface, respectively, the radius, r, of the sphere the reflectivities of the reference scatterer as a function of incident grazing angle;

d. calculating the phase correction introduced by $\theta(x_h,y_h)$, the grazing scattering angle for the incident x-rays from the reference scattering sphere;

e. calculating $A(x_h,y_h)$, the reflectivity function for scattered radiation by the reference scattering sphere for each value of $\theta$ in order to determine the intensity of the scattered wave;

f. calculating and storing the basis functions, $B_i(x_h,y_h)$ which represent interferences between a reference point $(x_r,y_r)$ and individual points $(x_o,y_o)$ in the object;

g. calculating the correlation function $C_i(s_x,s_y,n) \equiv$ $$C_i(s_x, s_y, n) = \int_{x_h}\int_{y_h} H(x_h, y_h) \cdot B_i[n \cdot (x_h - s_x), n \cdot (y_h - s_y)]dx_h dy_h;$$

f. calculating $D_i = C_i(s_{xp},s_{yp},n_p)\delta(s_{xp},s_{yp},n_p)$, where $(s_{xp},s_{yp},n_p)$ are the coordinates at which $C_i$ is a maximum, and $\delta(s_{xp},s_{yp},n_p)=1$, $\delta$ being equal to zero for all other coordinates;

g. locating the maximum of the function $C(s_x,s_y,n) = \Sigma D_i$ in order to determine the coordinates $(s_{xp},s_{yp},n_p)$ for the hologram;

h. correcting the $B_i$s for the phase shifts thus obtained; and i. forming the inner product of the $H(x_h,y_h)$ measured in said step of detecting and recording holographic information array and the $B_i$s to yield the amplitude, $|R_i|$, of the points in the reconstructed object.

2. The method as described in claim 1, further comprising the step of subtracting M, a constant background value, from the detected hologram in order to produce a purely oscillatory detected signal with no offset before said step of calculating the $|R_i|$.

3. The method as described in claim 1, further comprising the step of removing the "confusing wave" by applying a high pass frequency filter to the hologram function before said step of calculating the $|R_i|$.

4. The method as described in claim 3, wherein fast Fourier transforms are in said step of removing the "confusing wave."

* * * * *